Oct. 28, 1924.  1,513,416

F. H. NULLMEYER

ROD REEL

Filed July 13, 1923    3 Sheets-Sheet 2

INVENTOR
Frank H. Nullmeyer
By Byrnes, Stebbins & Parmelee
His Attys

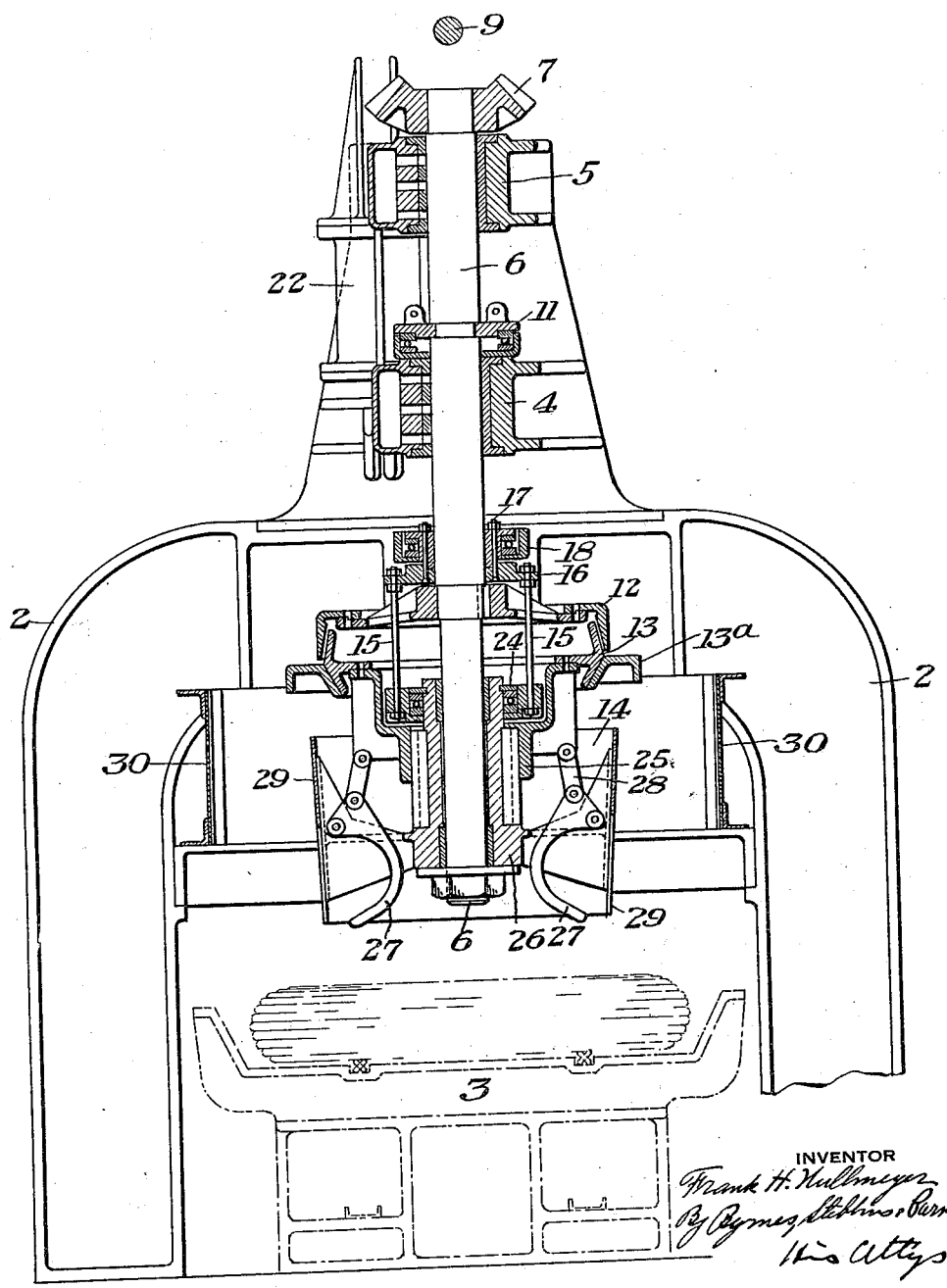

Patented Oct. 28, 1924.

1,513,416

UNITED STATES PATENT OFFICE.

FRANK H. NULLMEYER, OF STRUTHERS, OHIO.

ROD REEL.

Application filed July 13, 1923. Serial No. 651,368.

*To all whom it may concern:*

Be it known that I, FRANK H. NULLMEYER, a citizen of the United States, residing at Struthers, Mahoning County, Ohio, have invented a new and useful Improvement in Rod Reels, of which the following is a full, clear, and exact description.

This invention relates to an improvement in rod reels and more particularly reels which are used for reeling up rods as they pass from the rolls.

The object of my invention is to provide a reel which is simple in construction, which can be readily thrown into and out of action to first reel up the rod as it passes from the rolls and then dump or empty the reel and automatically stop the rotation of the reel during the dumping operation.

Another object of my invention is to provide a reel in which there is no danger of maintaining a connection between the reel-driving mechanism and reel brake when shifting from dumping position to reeling position or from reeling position to dumping position.

Another object of my invention is to provide a reel having a bottom dump, whereby the reeled rod may be dropped in a vertical manner in a line substantially perpendicular to the conveyor which conveys the reeled rod from the reels.

The precise nature of my invention will be best understood by reference to the accompanying drawings, which will now be described, it being premised, however, that various changes may be made in the details of construction, without departing from the spirit and scope of my invention as defined in the appended claims.

In the drawings:

Figure 3 is a view similar to Figure 2, showing the parts in dumping position.

Figure 1:
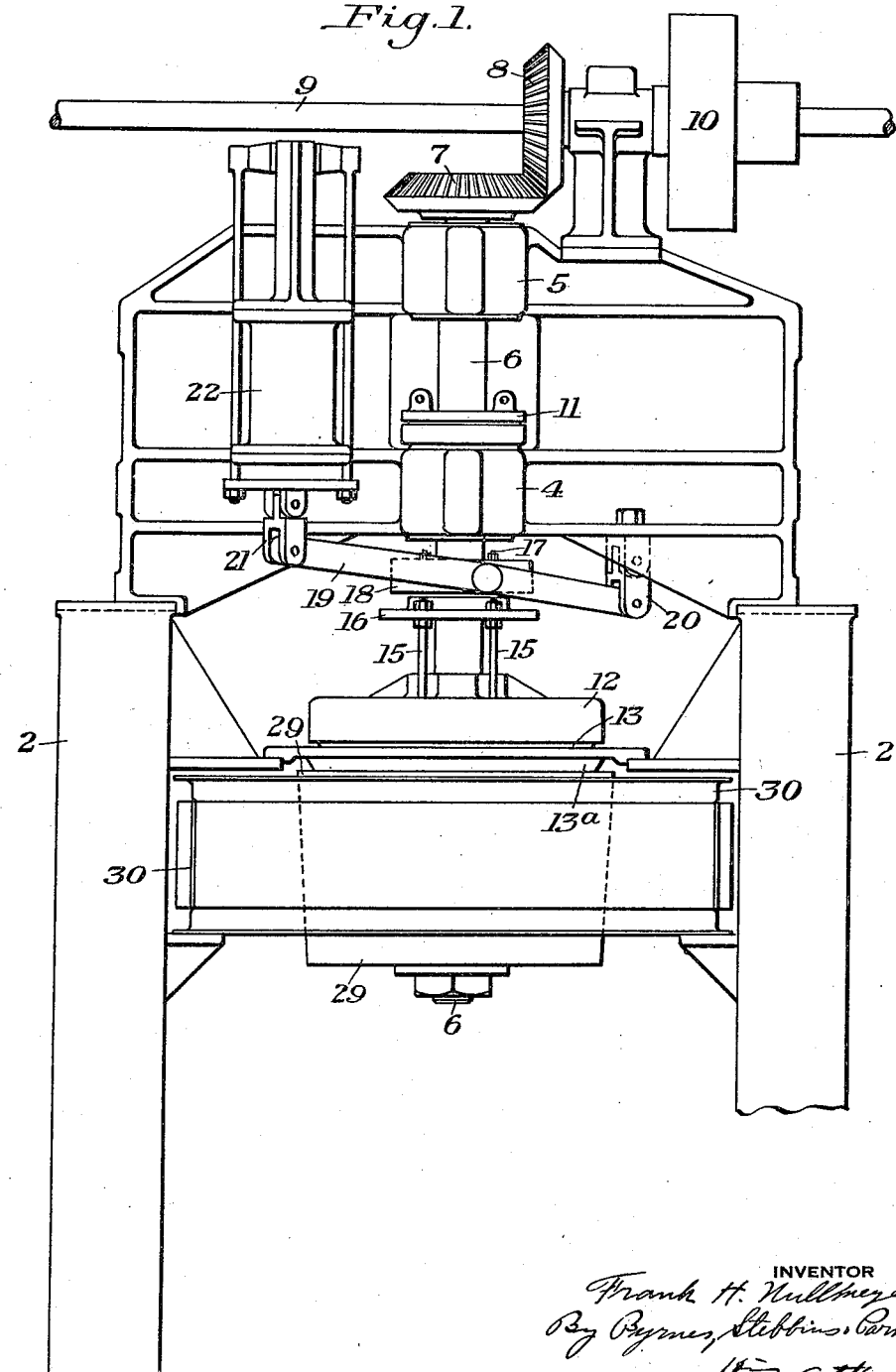
Figure 1 is a side elevation of one form of reel constructed in accordance with my invention.

Referring to the drawings, the reference character 2 designates the frame of the structure or housing comprising legs which straddle the conveyor mechanism 3, shown in broken lines between the legs. In common practice, there is a series of reels placed over the conveyor, the reels alternately taking a rod as it comes from the rolls and reeling it, and after the full rod has been reeled, the coiled rod is dropped to the conveyor by which it is taken to the desired point.

Rotatably mounted in bearings 4 and 5 in the housing or frame 2 is a shaft 6, the upper end of which is provided with a bevel gear 7, which meshes with a bevel gear 8 on the longitudinal shaft 9, which is also arranged to drive several reels and which may be driven by means of a driving connection to a pulley 10.

Figure 2:
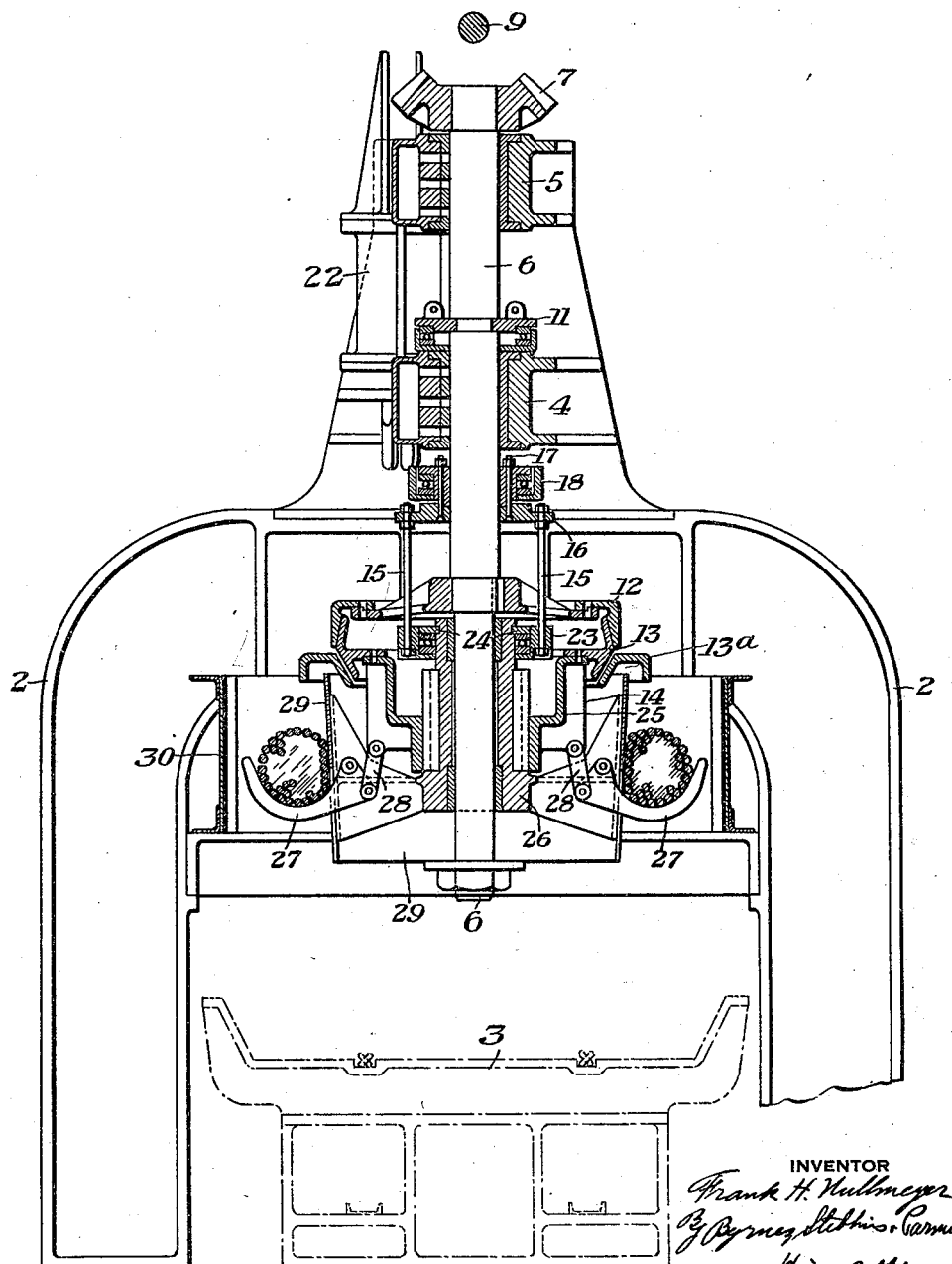
Figure 2 is a vertical section through the reel and its operating mechanism showing the reel in its running position with a portion of a rod held within the reel.

Connected to the shaft 6 and arranged to rotate therewith is a runner 11, which bears on balls above the bearing 4, and which runner supports the load on the shaft. Connected to the shaft and adapted to rotate therewith is a clutch member 12, which is arranged to be engaged by a clutch member 13, on the reel 14 when the reel is elevated, as indicated in Figure 2. 13ª is a brake member fixedly connected to the frame 2, and which is arranged to be engaged by the clutch member 13 to arrest the rotary motion of the reel when the reel is shifted from its reeling position to its dumping position, as shown in Figure 3.

The reel 14 is rotatably mounted on the shaft 6, and is suspended from a support on the shaft by means of four rods 15. The rods 15 engage a lower flange of a ring 16, formed of two parts; which surround the shaft 6 and are secured to each other by bolts 17. This ring 16 is supported on ball bearings between the flanges of the two ring members which are, in turn, supported by a flanged ring 18, supported by a lever 19. The lever 19 is pivotally connected at one end to a yoke member 20, supported from the frame of the machine, while the other end thereof is connected to a yoke member 21, connected to a piston in a cylinder 22. The lower ends of rods 15 are connected to a ring 23, on which are supported ball bearings which, in turn, support the hub of reel 14 through the medium of a ring member 24 in an annular groove in the hub of the reel 14.

The reel preferably comprises two elements 25 and 26, which are splined to each other, so that both members rotate together while one of the members may be moved relative to the other in a longitudinal direction. Pivotally connected to the member 26 are a plurality of hook members 27 and pivotally connected to the member 25 and one of the hook members 27 is a link member 28, the arrangement being such that when the reel is in its winding position, as shown in Figure 2, the hooks will support the rod as it is being reeled, and when said parts are in the position shown in Figure 3, the hooks will be withdrawn to permit the reeled rod to drop on to the conveyor.

Surrounding the member 26 and connected thereto is a cage member 29, having slots through which the hook members 27 are adapted to be moved, and 30 is a fixed cage member surrounding the rotary cage member.

When the machine is reeling, as illustrated in Figure 2, the clutch member 13 is in engagement with the clutch member 12, and will be rotated thereby to reel up the rod as it passes from the rolls, the rod being fed downwardly into the reel between the cages 29 and 30. When the entire rod has been reeled, the operator admits fluid pressure to the cylinder 22, to permit the lever 19 to lower the parts to the position shown in Figure 3. During the first part of the lowering movement, the clutch member 13 will engage the brake member 13ª and arrest the movement of the reel before the hooks 27 have been shifted to any appreciable extent. During the further downward movement and during the stopping of the reel, the hooks will be retracted to the position shown in Figure 3, to permit the coiled rod to drop from between the cages 29 and 30 to the conveyor 3, the motion of the reel being entirely arrested before the reeled rod is released from the hooks 27. After the reeled rod has been dumped, the operator again controls the flow of fluid pressure to the cylinder 22, to raise the reel to the position shown in Figure 2, and during its upward movement, the hooks will first be thrown inwardly and immediately after the clutch element 13 is released from the brake member 13ª it will engage the driving clutch element 12, so that the reel will be driven by the shaft 6.

The advantages of my invention result from the provision of a reel in which the driving elements are released before the brake is applied, and when the parts are moved to the reverse order, the brake element is released before the driving elements are engaged.

Another advantage results from the provision of a bottom dumping reel, in which the coiled rod is dropped in a flat manner from the reel to the conveyor.

I claim:

1. A rod reeling device, having a frame, a vertical shaft journaled in the frame, a reel movable along the axis of the shaft, means for connecting the reel to the shaft, when the reel is raised, and means for raising the reel and for supporting the load on the reel independent of the shaft when reeling, substantially as described.

2. A rod reeling device, having a frame, a vertical shaft journaled in the frame, a reel movable along the axis of the shaft, means for connecting the reel to the shaft when the reel is raised, means for braking the reel when the reel is lowered, and means for raising and lowering the reel and for supporting the load on the reel independent of the shaft when reeling, substantially as described.

3. A rod reeling device, comprising a frame, a vertical shaft journaled in the frame, a reel rotatably mounted on the shaft and movable along the shaft, means for connecting the reel in driving relation with the shaft, a support for the reel arranged to support the reel and the load thereon when the reel is in driving relation with the shaft, and means for raising and lowering the support for the reel.

4. A rod reeling device, comprising a frame, a vertical shaft journaled in the frame, a reel rotably mounted on the shaft and movable along the shaft, means for connecting the reel in driving relation with the shaft, a brake for the reel, a support for the reel arranged to support the reel and the load thereon when the reel is in driving relation with the shaft, and means for raising and lowering the support to raise the reel into driving connection with the shaft and for lowering it into braking position.

5. A rod reeling device, comprising a frame, a vertical shaft journaled in the frame, means for rotating the shaft, a clutch member connected to the shaft, a reel having two elements movable along the axis of the shaft, hooks connected to both of said elements and arranged to be moved into both reeling and dumping positions by the movement of the reel elements, a driving clutch member connected to one element, a support for one of said elements surrounding the shaft, means on said elements for raising the one when the other is raised and for permitting the last element to move independently of the first for actuating the hooks and connecting the reel with the clutch or the brake, and means for raising or lowering the support, substantially as described.

6. A rod reeling device comprising a frame, a vertical shaft rotatably mounted in bearing on the frame, a clutch element on the shaft, a reel having two elements arranged to be rotated on the shaft, said elements being connected for longitudinal movement relative to each other and to the shaft along the axis of the shaft but arranged to be rotated together, a brake member surrounding the shaft and fixed to the frame, a clutch element connected to one of the elements of the reel and located between the clutch element on the shaft and the brake member, reeling devices on the other reel element, reeling device actuating connections between said devices and the first mentioned reel element, and means for raising and lowering the last reel element, to shift the reeling devices into and out of reeling position and to shift the clutch member on the reel into operative engagement with the clutch element on the shaft or the brake, substantially as described.

7. A rod reel having a vertical shaft, a reel on the shaft having upper and lower members, said members being connected to rotate together but to permit movement along the shaft, means for raising and lowering the lower reel element, means for limiting the downward movement of the upper reel element, reeling devices connected to the two reel elements arranged to reel a rod when the reel elements are in their raised positions and to dump the reel rod when said elements are in their lowered positions, the longitudinal movement of the lower reel element being greater than the movement of the upper reel element, and means for driving one of the reel elements, substantially as described.

8. A rod reel having a vertical shaft, a reel on the shaft having upper and lower members, said members being connected to rotate together but to permit movement along the shaft, means for raising and lowering the lower reel element, means for limiting the downward movement of the upper reel element, reeling devices connected to the two reel elements arranged to reel a rod when the reel elements are in their raised positions and to dump the reel rod when said elements are in their lowered positions, the longitudinal movement of the lower reel element being greater than the movement of the upper reel element, and means for connecting the upper reel element to the shaft when said reel elements are raised, substantially as described.

9. A rod reel having a vertical shaft, a reel on the shaft having upper and lower members, said members being connected to rotate together but to permit movement along the shaft, means for raising and lowering the lower reel element, means for limiting the downward movement of the upper reel element, reeling devices connected to the two reel elements arranged to reel a rod when the reel elements are in their raised positions and to dump the reeled rod when said elements are in their lowered positions, the longitudinal movement of the lower reel element being greater than the movement of the upper reel element, means for connecting the upper reel element to the shaft when said reel elements are raised, and a brake for arresting the rotary movement of the reel when the reel elements are lowered, substantially as described.

10. A device of the character described, having a vertical driving shaft, a driving member on the shaft having a conical driving face, a reel on the shaft having upper and lower members, a brake surrounding the shaft having a conical face, reeling hooks connected to both reel members and arranged to be held in reeling position when the reel members are elevated and for clearing the reel of a reeled bundle when the reel members are lowered, means for raising and lowering the lower reel member, the upper member being raised and lowered to a lesser degree by the lower member through the medium of the hooks, and stop means on the upper member between the driving member on the shaft and the brake having conical faces for engagement with either the brake or driving member, substantially as described.

In testimony whereof I have hereunto set my hand.

FRANK H. NULLMEYER.